P. HAYDEN.
Hames.
No. 207,519. Patented Aug. 27, 1878.
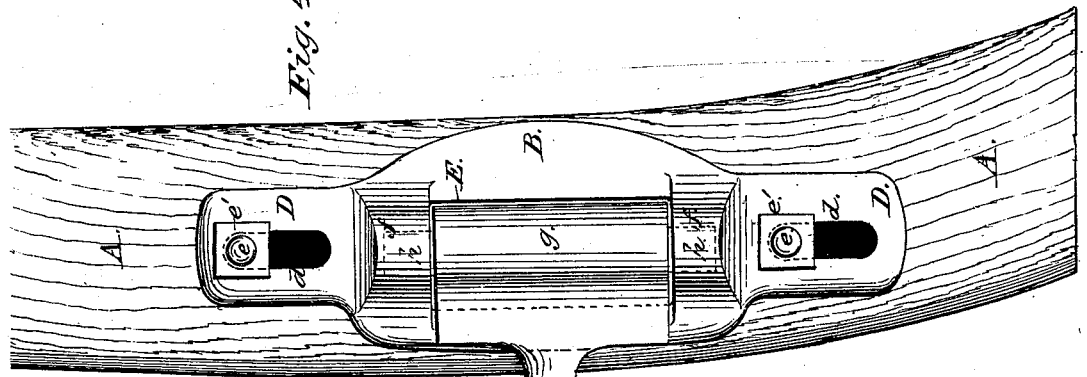
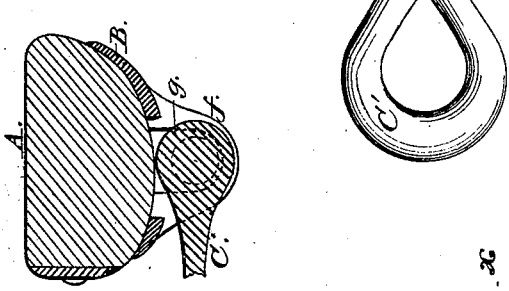
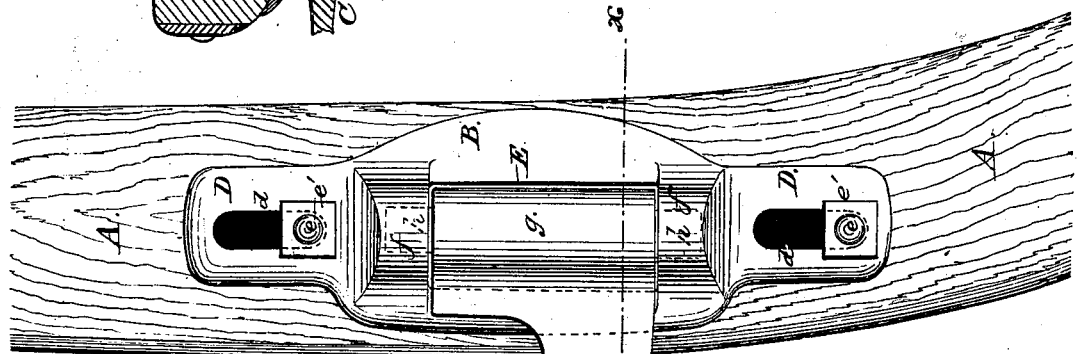
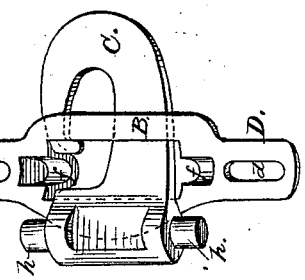
Witnesses:
T. C. Brecht
Wm Beale Hale
Inventor:
P. Hayden,
By James L. Norris
Attorney.

UNITED STATES PATENT OFFICE.

PETER HAYDEN, OF COLUMBUS, OHIO.

IMPROVEMENT IN HAMES.

Specification forming part of Letters Patent No. 207,519, dated August 27, 1878; application filed August 2, 1878.

*To all whom it may concern:*

Be it known that I, PETER HAYDEN, of Columbus, in the county of Franklin and State of Ohio, have invented certain new and useful Improvements in Hames, of which the following is a specification:

This invention relates to an improvement in the device for attaching the traces of harness to the hames; and its object is to enable the traces to be adjusted to accommodate the draft to different animals.

It consists, first, in a hame having on its outer surface a base-plate provided at each end with a longitudinally-slotted ear, and having projecting cap-bearings, between which is journaled a shaft or roller provided with a hook or eye, said plate and hook or eye being adjustable vertically by means of the slots in the end ears of the base-plate, and screw-threaded studs projecting from the hame through said slots, and provided with suitable clamping-nuts, substantially as and for the purpose hereinafter set forth; second, in the combination, with a hame-trace hook or eye having its shank provided with laterally-projecting journals, of a base-plate which is vertically adjustable by means of longitudinal slots in its ends, said plate having through its main portion a longitudinal central slot, at the ends of which are caps overhanging said slot and adapted to fit over the journals of the hook or eye shank when the said hook or eye is passed outwardly through said central slot, as hereinafter more particularly described.

In the drawings, Figure 1 is a view of my improved trace attachment on a hame. Fig. 2 is a bottom view of the hook or eye retaining plate with a hook partially inserted. Fig. 3 is a cross-section on line $x\ x$, Fig. 1; and Fig. 4 is a view showing an eye journaled in the plate in lieu of a hook.

The letter A indicates the hame. B is the adjustable plate, in which the hook or eye C or C', for engaging the forward end of the trace, is journaled. At each end this plate is provided with an ear, D, in which is a longitudinal slot, $d$. These slots fit over the screw-threaded studs $e\ e$ projecting from the hame, and permit the adjustment of the plate up or down, the nuts $e'\ e'$ serving to secure the plate in position.

In the main portion of the plate B is also a longitudinal slot, E, and at each end of this slot is an overhanging cap, $f$.

The hook C is cast with an elbow shank or roller, $g$, provided with a journal, $h$, at each end, and in connecting the hook or eye having a similar shank to the plate the hook or eye portion is passed through the slot E from the back of the plate, and the journals $h$ catch and fit into the caps $f$, which serve to retain said journals and form bearings therefor.

The hooks are especially adapted for chain-traces; but to adapt the harness for leather traces having forward loops attached to the traces by clips, I prefer to use the simple eye, as shown in Fig. 4. Each pair of harness, however, may be provided with two sets of the adjustable plates, one set having eyes and the other having hooks, and one set of these plates may be removed from the harness and replaced by the other when it is desired to change the traces.

By the peculiar formation of my adjustable retaining-plates and the hooks or eyes they can be easily cast and readily securely attached together or separated, so that if either of the parts be broken another may be substituted without mechanical skill.

Having now fully described my invention, I claim—

1. A hame having on its outer surface a base-plate provided at each end with a longitudinally-slotted ear, and having projecting cap-bearing, between which is journaled a shaft or roller provided with a hook or eye, said plate and hook or eye being adjustable vertically by means of the slots in the end ears of the base-plate, and screw-threaded studs projecting from the hame through said slots, and provided with suitable clamping-nuts, substantially as and for the purpose set forth.

2. The combination, with a hame-trace hook or eye having its shank provided with laterally-projecting journals, of a base-plate which is vertically adjustable by means of longitudinal slots in its ends, said plate having through its main portion a longitudinal central slot, at the end of which are caps overhanging said slot, and adapted to fit over the journals of the hook or eye shank when the said hook or eye is passed outwardly through said central slot, substantially as described.

In testimony that I claim the foregoing I have hereunto set my hand in the presence of the subscribing witnesses.

PETER HAYDEN.

Witnesses:
JNO. M. GWINNELL,
C. W. ANDERSON.